(12) United States Patent
Eom et al.

(10) Patent No.: US 11,977,497 B2
(45) Date of Patent: May 7, 2024

(54) I/O SCHEDULING METHOD BASED ON SYSTEM CALL ORDER CONSIDERING FILE FRAGMENTATION, SYSTEM FOR PERFORMING SAME AND COMPUTER READABLE STORAGE MEDIUM INCLUDING EXECUTIONS CAUSING PROCESSOR TO PERFORM SAME

(71) Applicant: Research & Business Foundation Sungkyunkwan University, Suwon-si (KR)

(72) Inventors: Young Ik Eom, Suwon-si (KR); Jong Gyu Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 65 days.

(21) Appl. No.: 17/741,917

(22) Filed: May 11, 2022

(65) Prior Publication Data

US 2022/0365886 A1 Nov. 17, 2022

(30) Foreign Application Priority Data

May 12, 2021 (KR) .......................... 10-2021-0061328

(51) Int. Cl.
*G06F 13/10* (2006.01)
*G06F 9/54* (2006.01)

(52) U.S. Cl.
CPC .............. *G06F 13/102* (2013.01); *G06F 9/54* (2013.01)

(58) Field of Classification Search
CPC .................................. G06F 9/54; G06F 13/102
See application file for complete search history.

(56) References Cited

U.S. PATENT DOCUMENTS

| | | | |
|---|---|---|---|
| 8,756,382 B1 * | 6/2014 | Carlson | G06F 3/064 711/170 |
| 2002/0091763 A1 * | 7/2002 | Shah | G06F 8/65 709/203 |
| 2005/0289559 A1 * | 12/2005 | Illowsky | G06F 8/63 719/318 |

(Continued)

FOREIGN PATENT DOCUMENTS

KR 10-1995460 B1 7/2019

OTHER PUBLICATIONS

Park, Jonggyu et al., "A I/O Scheduler Based on System Call Ordering for Fragmentation," Proceedings of the Korea Software Congress, Dec. 31, 2020, (English Abstract, 2 pages in Korean).

*Primary Examiner* — Zachary K Huson
(74) *Attorney, Agent, or Firm* — NSIP Law

(57) ABSTRACT

There is provided a method for an I/O (input/output) scheduling method, the method comprises: assigning a system call identifier to each of a plurality of I/O requests derived from at least one system call requested by at least one application; sorting the plurality of I/O requests in order of the system call identifier; and transferring the sorted plurality of I/O requests to a computer-readable storage medium. Accordingly, in a mobile or desktop environment in which an application that frequently interacts with the user is executed, it is possible to minimize the read delay time increased due to file fragmentation, and moreover, it is possible to improve the user experience (UX).

12 Claims, 5 Drawing Sheets

(56) References Cited

U.S. PATENT DOCUMENTS

2010/0153657 A1\* 6/2010 Vasek ................. G06F 12/0879
711/144
2017/0104820 A1\* 4/2017 Golander ............ H04L 67/1097
2018/0322075 A1\* 11/2018 Kim .................... G06F 13/1626

\* cited by examiner

I/O SCHEDULING METHOD BASED ON SYSTEM CALL ORDER CONSIDERING FILE FRAGMENTATION, SYSTEM FOR PERFORMING SAME AND COMPUTER READABLE STORAGE MEDIUM INCLUDING EXECUTIONS CAUSING PROCESSOR TO PERFORM SAME

CROSS REFERENCE TO RELATED APPLICATIONS

This application claims the benefit under 35 USC 119(a) of Korean Patent Application No. 10-2021-0061328 filed on May 12, 2021, in the Korean Intellectual Property Office, the entire disclosures of which are incorporated herein by reference for all purposes.

TECHNICAL FIELD

The present disclosure relates to an I/O scheduling method, a system for performing the same, and a computer-readable storage medium including executions for performing the I/O scheduling method, and more particularly, to an I/O scheduling method based on a system call order, a system for performing the same, and a computer-readable storage medium including computer executable instructions for performing the I/O scheduling method.

BACKGROUND OF THE INVENTION

File fragmentation means that files in the filesystem layer are not allocated one continuous block but are allocated several fragmented blocks. That is, the LBA (Logical Block Address) of the data block included in one file in the filesystem layer is not continuous. The causes of file fragmentation vary depending on the type of the filesystem, but file fragmentation is an unavoidable phenomenon in most filesystems if the filesystem is continuously used.

File fragmentation adversely may affect the performance of block input/output (hereinafter, 'I/O') for various reasons. In the kernel layer, excessive I/O requests may occur due to the file fragmentation. In the case of the application layer or VFS (Virtual File System) layer, which is a higher layer than the filesystem, the file is accessed using an offset, whereas in the filesystem layer, the file is accessed using LBA. However, the bio structure and the request structure used when transferring I/O from the filesystem layer to the block layer can represent continuous blocks on the LBA. Therefore, if the file fragmentation occurs, even if the application requests one read system call, it may be converted into multiple requests. In this case, the file fragmentation may degrade the I/O performance from the application's point of view, because the I/O completion signal is sent to the application only when all requests derived from the system call are processed.

In addition, most I/O schedulers including Deadline, may sort requests in LBA order to minimize the seek time in the computer-readable storage medium (e.g., HDD). If the requests divided by the file fragmentation are mixed with other requests, the I/O delay time may increase further from the application's point of view.

BRIEF SUMMARY OF THE INVENTION

The object of the present disclosure to solve the above problems is to provide an I/O scheduling method capable of effectively reducing the delay time of sequential read in a system in which files are fragmented and further improving the user experience (UX), and to provide a system for performing the same.

However, the problem to be solved by the present disclosure is not limited thereto, and may be variously expanded without departing from the spirit and scope of the present disclosure.

In accordance with an aspect of the present disclosure, there is provided a method for an I/O (input/output) scheduling method, the method comprises: assigning a system call identifier to each of a plurality of I/O requests derived from at least one system call requested by at least one application; sorting the plurality of I/O requests in order of the system call identifier; and transferring the sorted plurality of I/O requests to a computer-readable storage medium.

Wherein the assigning of the system call identifier to each of the plurality of I/O request comprises: checking whether a file associated with the plurality of I/O requests is fragmented; and assigning the same system call identifier to I/O requests derived from the same system call among the plurality of I/O requests when the file is fragmented.

Wherein the system call identifier is a unique number assigned to each of a plurality of system calls.

Wherein the assigning of the system call identifier to each of the plurality of I/O request comprises: declaring a variable indicating an order of each of at least one system call in a bio structure and a request structure; and storing the unique number in the variable indicating the order of each of the at least one system call.

Wherein the computer-readable storage medium is a flash-based storage medium.

In accordance with another aspect of the present disclosure, there is provided an I/O scheduling system, the system comprises: a system call identifier assigning unit configured to assign a system call identifier to each of a plurality of I/O requests derived from at least one system call requested by at least one application; a sorting unit configured to sort the plurality of I/O requests in order of the system call identifier; and a transferring unit configured to transfer the sorted plurality of I/O requests to a computer-readable storage medium.

Wherein the system call identifier assigning unit is configured to: check whether a file associated with the plurality of I/O requests are fragmented; and assign the same system call identifier to an I/O request derived from the same system call among the plurality of I/O requests, when the file is fragmented.

Wherein the system call identifier is a unique number assigned to each of a plurality of system calls.

Wherein the system call identifier assigning unit is configured to: declare a variable indicating an order of each of the at least one system call in a bio structure and a request structure; and store the unique number in a variable indicating the order of each of the at least one system call.

Wherein the computer-readable storage medium is a flash-based storage medium.

In accordance with another aspect of the present disclosure, there is provided a non-transitory computer-readable recording medium storing a computer program, which comprises instructions configured for a processor to execute a method of estimating hemoglobin concentration, the method comprises: assigning a system call identifier to each of a plurality of I/O requests derived from at least one system call requested by at least one application; sorting the plurality of I/O requests in order of the system call identifier; and transferring the sorted plurality of I/O requests to a computer-readable storage medium.

Wherein the assigning of the system call identifier to each of the plurality of I/O request comprises: checking whether a file associated with the plurality of I/O requests is fragmented; and assigning the same system call identifier to an I/O request derived from the same system call among the plurality of I/O requests when the file is fragmented.

Wherein the system call identifier is a unique number assigned to each of a plurality of system calls.

Wherein the assigning of the system call identifier to each of the plurality of I/O request comprises: declaring a variable indicating an order of each of at least one system call in a bio structure and a request structure; and storing the unique number in the variable indicating the order of each of the at least one system call.

Wherein the computer-readable storage medium is a flash-based storage medium.

The disclosed technology may have the following effects. However, it does not mean that a specific embodiment should include all of the following effects or only the following effects, so the scope of the disclosed technology should not be understood as being limited thereby.

According to the I/O scheduling method and the system for performing the I/O scheduling method according to the above-described embodiments of the present disclosure, it is possible to minimize the read delay time increased due to the file fragmentation in a mobile or desktop environment in which an application that frequently interacts with the user is executed, and it is possible to improve the user experience (UX).

DETAILED DESCRIPTION

Figure 1:
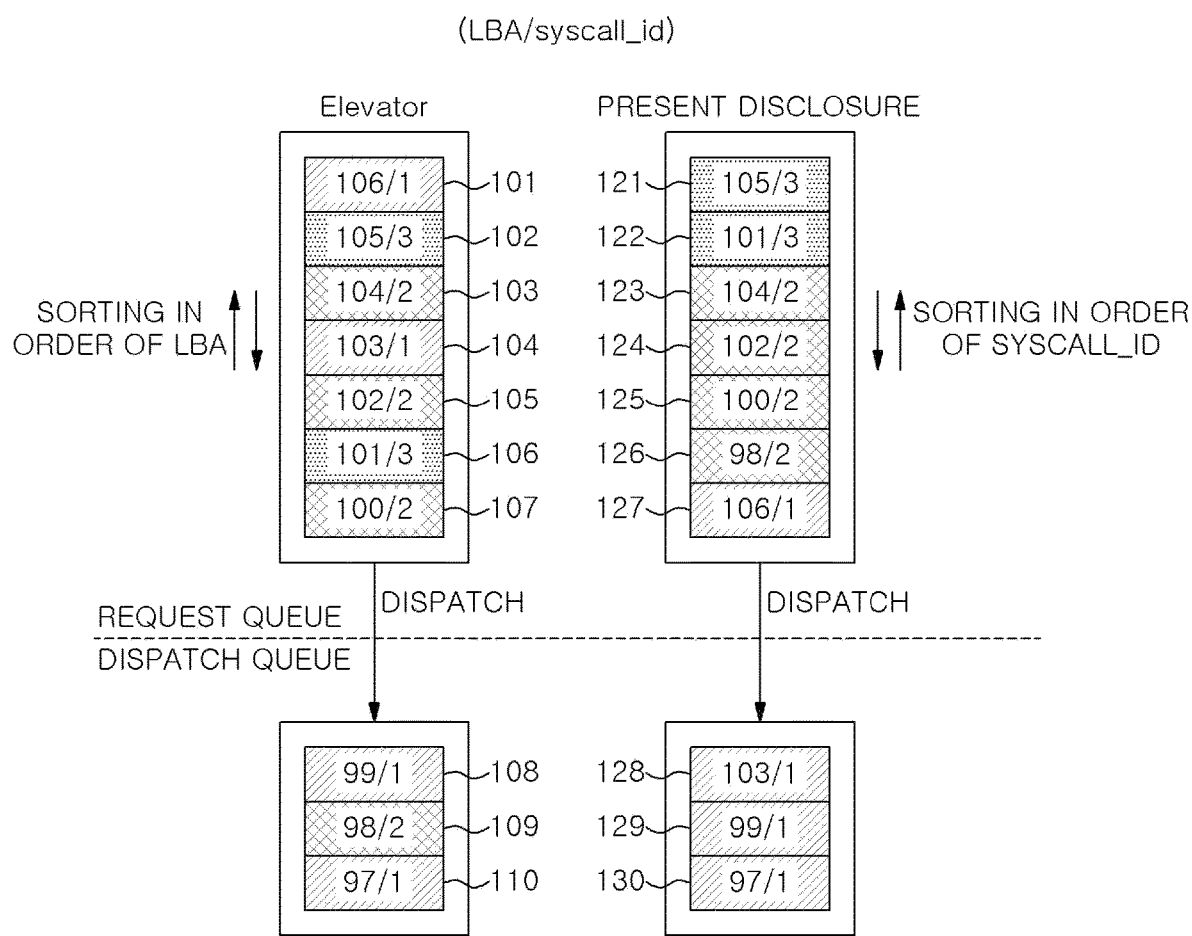
FIG. 1 shows a comparison between an I/O scheduling method according to an embodiment of the present disclosure and an I/O scheduling method according to the prior art.

While the present disclosure can have various changes and various embodiments, specific embodiments are illustrated in the drawings and are described in detail.

However, this is not intended to limit the present disclosure to a specific embodiment, and it should be understood to include all modifications, equivalents or substitutes included in the spirit and scope of the present disclosure.

Terms such as first, second, etc. may be used to describe various elements, but the elements should not be limited by the terms. These terms are used only for the purpose of distinguishing one component from another. For example, without departing from the scope of the present disclosure, a first component may be referred to as a second component, and similarly, a second component may also be referred to as a first component.

When a component is referred to as "connected" or "linked" to another component, it may be understood that the component is directly connected or linked to the another component, or other components may exist between two components. On the other hand, when it is said that a certain component is "directly connected" or "directly linked" to another component, it should be understood that no other element exists between the two components.

The terms used in the present application are only used to describe specific embodiments, and are not intended to limit the present disclosure. The singular expression includes the plural expression unless the context clearly indicates otherwise. In the present application, terms such as "comprise" or "have" are intended to designate that a feature, a number, a step, an operation, a component, a part, or a combination thereof described in the specification exists, and it should be understood that it does not preclude the possibility of addition or existence of one or more other features, numbers, steps, operations, components, parts, or combinations thereof.

Unless defined otherwise, all terms used herein, including technical or scientific terms, have the same meaning as commonly understood by one of ordinary skill in the art to which this invention belongs. Terms such as those defined in a commonly used dictionary should be interpreted as having a meaning consistent with the meaning in the context of the related art, and are not interpreted in an ideal or excessively formal meaning unless explicitly defined in the present application.

Hereinafter, with reference to the accompanying drawings, preferred embodiments of the present invention will be described clearly and in detail so that those of ordinary skill in the art can easily implement the present invention.

FIG. 1 shows a comparison between an I/O scheduling method according to an embodiment of the present disclosure and an I/O scheduling method according to the prior art.

The left part of FIG. 1 shows the Elevator function as a prior art. Elevator is one of input/output (hereinafter, referred to as 'I/O') scheduling method and may sort multiple I/O requests in the order of LBA (Logical Block Address). Elevator can effectively reduce the physical seek time in a system equipped with a hard disk (HDD), but it can adversely affect I/O performance in a flash-based storage medium that does not have the seek time.

Specifically, in a Linux system, one I/O request may express only continuous data on the filesystem. Therefore, if the data requested by the application is located discontinuously on the filesystem, a separate I/O request must be generated for each successive piece. In other words, even if the application calls one read system call, multiple I/O requests may be actually generated in the kernel. Since the completion signal is delivered to the application that called the read system call only when all multiple I/O requests are processed, all requests derived from the system call should be processed as quickly as possible in order to minimize the read delay time.

However, most Linux I/O schedulers, including Deadline, do not consider this characteristic of file fragmentation. Most Linux I/O schedulers utilize the Elevator feature, which sorts I/O requests in LBA order. As described above, this method can effectively reduce the physical seek time in a system equipped with a hard disk, but when the file fragmentation occurs, it may adversely affect a flash-based storage medium that does not have the seek time. In case of the file fragmentation, since one read system call may be divided into multiple I/O requests, the divided I/O requests may be mixed with other requests due to the elevator function, which in turn may increase the read delay time.

Referring to the left side of FIG. 1, according to the Elevator, a plurality of I/O requests are sorted in LBA order and then dispatched from the request queue to the dispatch queue. When the file is fragmented, since the plurality of I/O requests are processed in LBA order, it takes a lot of time until all I/O requests generated by any one system call are processed. For example, in order to process all of the I/O requests 101, 104, 108 and 110 generated by the first system call and deliver a completion signal to the corresponding application, the last I/O request 101 among the corresponding I/O requests should be processed, so all of the I/O requests 102, 103, 105, 106, 107 and 109 generated by the second and third system calls should be processed. As a result, the I/O delay time may increase from the application's point of view.

In order to solve the above problem, the I/O scheduling method according to the embodiment of the present disclosure shown on the right side of FIG. 1 is based on a system call order. Specifically, a unique number is assigned to the system call requested by the application and the information is transmitted to the filesystem layer and the block layer. For example, it is possible to add a syscall_id item indicating the system call identifier to the bio structure and the request structure, and give each structure a corresponding number whenever it is created. And in the I/O scheduler, instead of the LBA, it is possible to sort through the syscall_id assigned to each I/O request. Through this, all the I/O requests derived from the same system call may be located sequentially, and improved read delay time may be guaranteed compared to the prior art (e.g., Elevator).

In the example of FIG. 1, since the I/O requests 127, 128, 129 and 130 generated by the first system call are processed earlier than the I/O requests 121, 122, 123, 124, 125 and 126 generated by the second and third system calls, the completion signal is delivered to the application that requested the first system call faster than in the case of the Elevator shown on the left side of FIG. 1, and thus the read delay time and the user experience (UX) can be improved.

Figure 2:
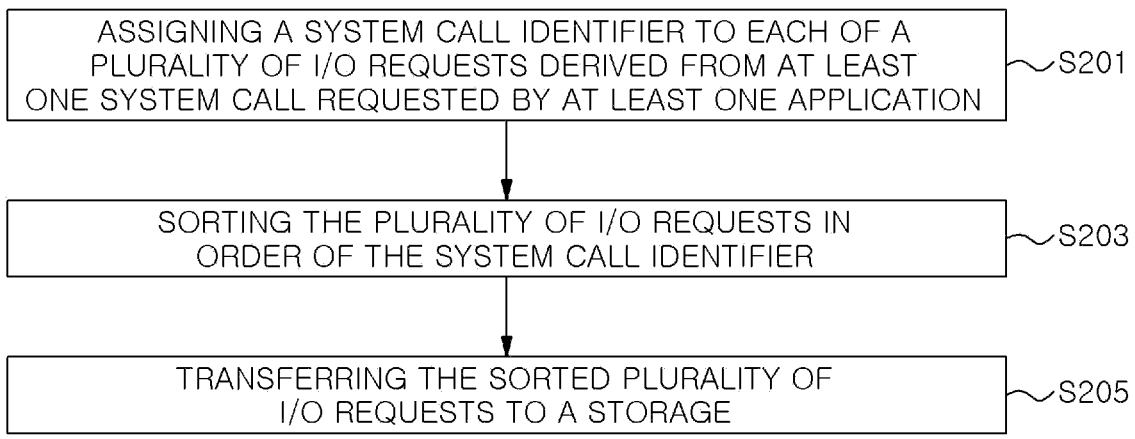
FIG. 2 is a flowchart of the I/O scheduling method according to the embodiment of the present disclosure.

FIG. 2 is a flowchart of the I/O scheduling method according to the embodiment of the present disclosure.

Referring to FIG. 2, in step S201, a system call identifier is assigned to each of the plurality of I/O requests derived from at least one system call requested by at least one application. The system call identifier is for distinguishing each system call from other system calls, and may be a unique number assigned to each system call.

In step S201, if the file is fragmented, the same system call identifier is given to I/O requests derived from the same system call. For example, in step S201, it is checked whether a file associated with the plurality of I/O requests is fragmented, and if the file is fragmented, the same system call identifier is given to the I/O requests derived from the same system call among the plurality of I/O requests.

Since the Linux system does not have a function to assign an order to a system call, step S201 can be implemented by declaring a new variable in a related structure. For example, step S201 may be implemented by declaring a variable (e.g., syscall_id) indicating the order of each of the at least one system call in the bio structure and the request structure, and by storing the unique number into the variable indicating the order of each of the at least one system call.

Thereafter, the plurality of I/O requests are sorted in the order of the system call identifier (S203), and the sorted plurality of I/O requests are transferred to storage medium (S205).

As a result, as shown on the right side of FIG. 1, a plurality of I/O requests are sorted in the order of system call identifier in the request queue and dispatched to the dispatch queue, and then the I/O process is processed according to the order of the system call identifier. Therefore, the read delay time can be reduced.

Figure 3:
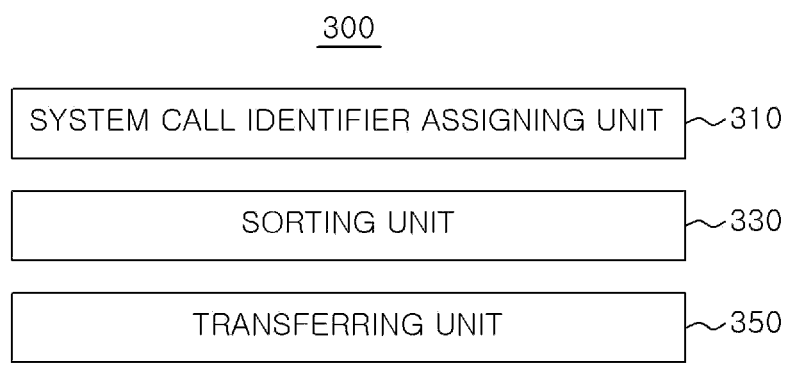
FIG. 3 is a block diagram of the I/O scheduling system according to the embodiment of the present disclosure.

FIG. 3 is a block diagram of the I/O scheduling system according to the embodiment of the present disclosure.

Referring to FIG. 3, an I/O scheduling system 300 according to the embodiment of the present disclosure includes a system call identifier assigning unit 310, a sorting unit 330, and a transferring unit 350.

The system call identifier assigning unit 310 assigns a system call identifier to each of a plurality of I/O requests derived from at least one system call requested by at least one application. The system call identifier is for distinguishing each system call from other system calls, and may be a unique number assigned to each system call.

If the file is fragmented, the system call identifier assigning unit 310 assigns the same system call identifier to I/O requests derived from the same system call. For example, the system call identifier assigning unit 310 checks whether a file associated with the plurality of I/O requests is fragmented, and if the file is fragmented, the same system call identifier can be assigned to I/O requests derived from the same system call among the plurality of I/O requests.

For example, the system call identifier assigning unit 310 may declare a variable (e.g., syscall_id) indicating the order of each of the at least one system call in the bio structure and the request structure, and may store the unique number in the variable indicating the order of each of the at least one system call.

The sorting unit 330 sorts the plurality of I/O requests in the order of the system call identifier.

And the transferring unit 350 transfers the sorted plurality of I/O requests to the storage medium.

A benchmark was performed by applying the I/O scheduling method according to the embodiment of the present disclosure. In order to create a fragmented file, random writes in 4 KB units were performed with 8 threads using the FIO benchmark. F2FS filesystem is used, and since F2FS allocates blocks in an Append-only method, fragmented files are created in units of the requests through random writes. After creating the files, sequential reads of 128 KB units were performed on the files by 8 threads, and the average delay time and the total throughput were measured. The reference values in FIGS. 4 and 5 are benchmark results in an existing Linux system using the Deadline scheduler.

Figure 4:
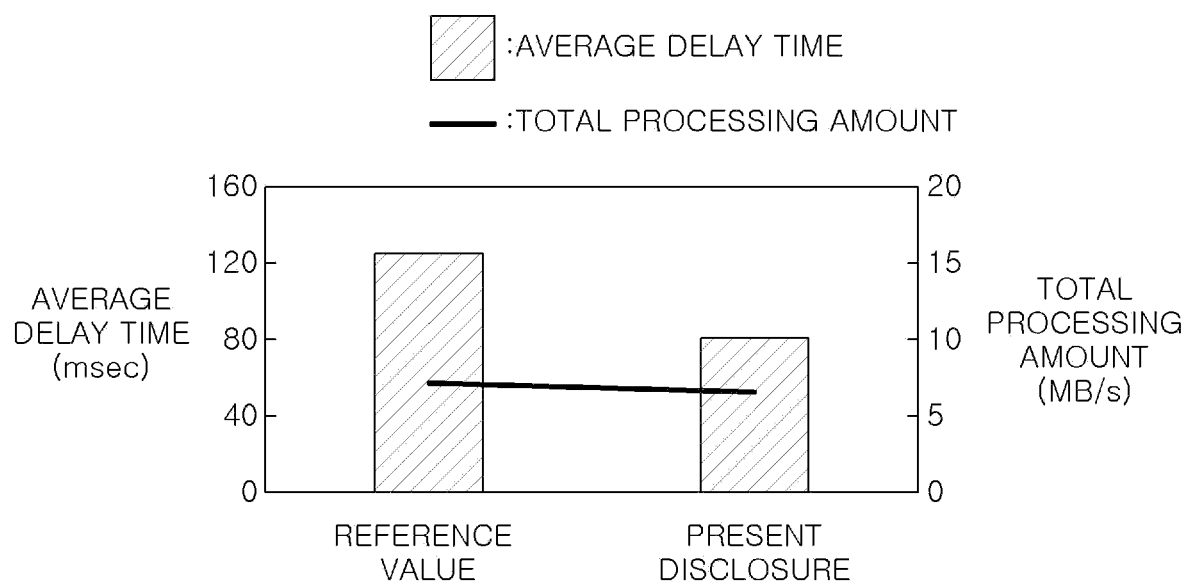
FIG. 4 is a graph showing a benchmark result of applying the I/O scheduling method according to the embodiment of the present disclosure to a MicroSD card.

FIG. 4 is a graph showing a benchmark result of applying the I/O scheduling method according to the embodiment of the present disclosure to a MicroSD card. In FIG. 4, the size of the file was designated as 10 MB.

Referring to FIG. 4, when applied to the MicroSD card, the average delay time was reduced by about 34% compared to the existing system. This is the delay time of system calls is effectively reduced by positioning I/O requests derived from each system call adjacent to each other because the I/O requests are sorted in the order of system calls rather than LBA. Meanwhile, the total throughput was decreased by about 18% compared to the existing system, which is thought to be because the existing system that sorts in LBA order uses the in-storage mapping cache more effectively.

Figure 5:
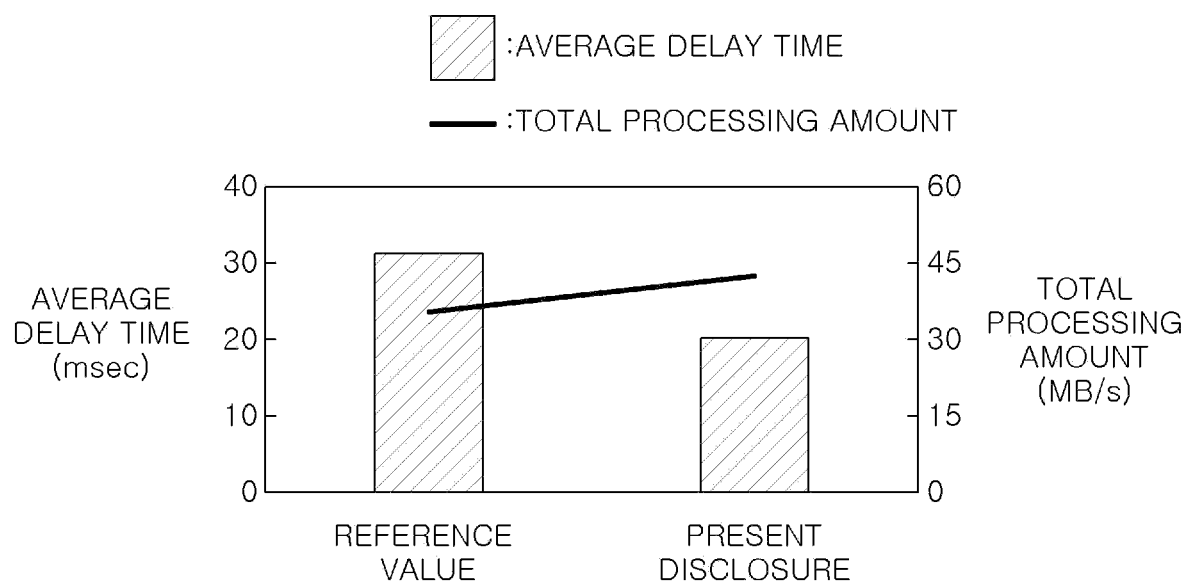
FIG. 5 is a graph showing a benchmark result of applying the I/O scheduling method according to the embodiment of the present disclosure to a SATA SSD.

FIG. 5 is a graph showing a benchmark result of applying the I/O scheduling method according to the embodiment of the present disclosure to a SATA SSD. In FIG. 5, the size of the file was designated as 100 MB.

Referring to FIG. 5, in the I/O scheduling method according to the embodiment of the present disclosure, the average delay time was decreased by about 25% and the total throughput was increased by about 21% compared to the reference value. The reason for the increase in total throughput on SATA SSDs is that the system call ends faster and the application can call the next system call faster, which resulted in parallelization of the I/O processing performed by the kernel. Compared to the result of FIG. 4, the MicroSD card does not show this effect as a performance advantage because the amount of time spent in the storage medium among the I/O delay time is significantly greater.

As described above, the I/O scheduling method and the system performing the I/O scheduling method according to the embodiments of the present disclosure can effectively reduce the delay time of sequential read in both of the MicroSD card and the SATA SSD. This shows that it can effectively improve the user experience (UX) in both mobile/desktop environments. In particular, sequential read performance has a huge impact on the loading performance of programs/applications, and the file fragmentation is an inevitable phenomenon in old systems. Thus, continuously high sequential read performance can be maintained in a mobile environment with a usage period of more than one year and a desktop environment with more usage period.

Although described above with reference to the drawings and the embodiments, it does not mean that the protection scope of the present disclosure is limited by the drawings or the embodiments. It will be understood for those skilled in the art that various modifications and variations of the present disclosure can be made without departing from the spirit and scope of the present disclosure described in the claims below.

What is claimed is:

1. An I/O (input/output) scheduling method comprising:
   determining whether a file associated with a plurality of I/O requests in a filesystem is fragmented;
   assigning a system call identifier to each of the plurality of I/O requests derived from at least one system call requested by at least one application, the system call identifier being assigned in ascending order according to an order in which the at least one system call request is made, and further wherein the same system call identifier is assigned to I/O requests derived from the same system call if it is determined that the file associated with the plurality of I/O requests in the filesystem is fragmented;
   sorting the plurality of I/O requests in order of the system call identifier; and
   transferring the sorted plurality of I/O requests to a computer-readable storage medium.

2. The method of claim 1, wherein the system call identifier is a unique number assigned to each of a plurality of system calls.

3. The method of claim 2, wherein the assigning of the system call identifier to each of the plurality of I/O request comprises:
   declaring a variable indicating an order of each of at least one system call in a bio structure and a request structure; and
   storing the unique number in the variable indicating the order of each of the at least one system call.

4. The method of claim 1, wherein the computer-readable storage medium is a flash-based storage medium.

5. An I/O scheduling system comprising one or more processors, where the one or more processors are collectively capable of:
   determining whether a file associated with a plurality of I/O requests in a filesystem is fragmented;
   assigning a system call identifier to each of the plurality of I/O requests derived from at least one system call requested by at least one application, the system call identifier being assigned in ascending order according to an order in which the at least one system call request is made, and further wherein the same system call identifier is assigned to I/O requests derived from the same system call if it is determined that the file associated with the plurality of I/O requests in the filesystem is fragmented;
   sorting the plurality of I/O requests in order of the system call identifier; and
   transferring the sorted plurality of I/O requests to a computer-readable storage medium.

6. The system of claim 5, wherein the system call identifier is a unique number assigned to each of a plurality of system calls.

7. The system of claim 6, wherein the one more processors are configured to:
   declare a variable indicating an order of each of the at least one system call in a bio structure and a request structure; and
   store the unique number in a variable indicating the order of each of the at least one system call.

8. The system of claim 5, wherein the computer-readable storage medium is a flash-based storage medium.

9. A non-transitory computer-readable storage medium comprising a plurality of computer-executable executions causing a processor to perform an I/O scheduling method, the I/O scheduling method comprising:
   determining whether a file associated with the plurality of I/O requests in a filesystem is fragmented;
   assigning a system call identifier to each of a plurality of I/O requests derived from at least one system call requested by at least one application, the system call identifier being assigned in ascending order according to an order in which the at least one system call request is made, and further wherein the same system call identifier is assigned to I/O requests derived from the same system call if it is determined that the file associated with the plurality of I/O requests in the filesystem is fragmented;
   sorting the plurality of I/O requests in order of the system call identifier; and
   transferring the sorted plurality of I/O requests to a computer-readable storage medium.

10. The non-transitory computer-readable storage medium of claim 9, wherein the system call identifier is a unique number assigned to each of a plurality of system calls.

11. The non-transitory computer-readable storage medium of claim 10, wherein the assigning of the system call identifier to each of the plurality of I/O request comprises:
   declaring a variable indicating an order of each of at least one system call in a bio structure and a request structure; and
   storing the unique number in the variable indicating the order of each of the at least one system call.

12. The non-transitory computer-readable storage medium of claim 9, wherein the computer-readable storage medium is a flash-based storage medium.

* * * * *